US012658702B2

(12) United States Patent
Hamaguchi et al.

(10) Patent No.: US 12,658,702 B2
(45) Date of Patent: Jun. 16, 2026

(54) ENERGY PREDICTION DEVICE, ENERGY PREDICTION METHOD, AND ENERGY PREDICTION PROGRAM

(71) Applicant: IHI Corporation, Tokyo (JP)

(72) Inventors: Kenichi Hamaguchi, Tokyo (JP); Sho Kazikura, Tokyo (JP); Kimitomo Ochi, Tokyo (JP)

(73) Assignee: IHI CORPORATION, Tokyo (JP)

( * ) Notice: Subject to any disclaimer, the term of this patent is extended or adjusted under 35 U.S.C. 154(b) by 366 days.

(21) Appl. No.: 18/515,344

(22) Filed: Nov. 21, 2023

(65) Prior Publication Data

US 2024/0195174 A1 Jun. 13, 2024

(30) Foreign Application Priority Data

Dec. 13, 2022 (JP) ................................. 2022-198572

(51) Int. Cl.
 *H02J 3/00* (2026.01)
 *G01W 1/10* (2006.01)
 *H02J 101/24* (2026.01)
(52) U.S. Cl.
 CPC ............... *H02J 3/004* (2020.01); *G01W 1/10* (2013.01); *H02J 2101/24* (2026.01)
(58) Field of Classification Search
 CPC ........ H02J 3/004; H02J 2101/24; H02J 3/003; H02J 3/381; G01W 1/10
 See application file for complete search history.

(56) References Cited

U.S. PATENT DOCUMENTS

| | | | |
|---|---|---|---|
| 2018/0060777 A1 | 3/2018 | Sun et al. | |
| 2019/0165580 A1 | 5/2019 | Doherty et al. | |
| 2020/0127598 A1* | 4/2020 | Chang .................... | G06Q 50/06 |
| 2020/0210537 A1* | 7/2020 | Wang ...................... | G06F 17/16 |
| 2023/0327440 A1 | 10/2023 | Watanabe et al. | |

FOREIGN PATENT DOCUMENTS

| | | |
|---|---|---|
| JP | 2001-014295 A | 1/2001 |
| JP | 2007-108809 A | 4/2007 |
| JP | 2009-104408 A | 5/2009 |
| JP | 2009-129159 A | 6/2009 |
| JP | 2013-255390 A | 12/2013 |
| JP | 5734325 B2 | 6/2015 |
| JP | 2019-146283 A | 8/2019 |
| JP | 6705716 B2 | 6/2020 |

(Continued)

OTHER PUBLICATIONS

Yuki Kawano, "Power demand forecasting device and power demand forecasting method" (ip.com machine translation of JP2013-255390A), Dec. 19, 2013, ip.com machine translations (Year: 2013).*

(Continued)

*Primary Examiner* — Christopher W Carter

(57) ABSTRACT

An energy prediction device performs: acquiring a plurality of temporary predicted values of energy which are predicted by a plurality of different prediction methods; and calculating a predicted value of energy by changing a proportion of at least one temporary predicted value out of the plurality of temporary predicted values according to a prediction time and blending the plurality of temporary predicted values.

10 Claims, 11 Drawing Sheets

(56) References Cited

FOREIGN PATENT DOCUMENTS

| | | |
|---|---|---|
| JP | 6915156 B2 | 8/2021 |
| JP | 7062144 B1 | 5/2022 |
| JP | 7075772 B2 | 5/2022 |
| JP | 2022-084328 A | 6/2022 |
| JP | 2022-121028 A | 8/2022 |
| WO | 2020/118586 A1 | 6/2020 |

OTHER PUBLICATIONS

Jyunichi Imura and Shinji Hara, "Photovoltaic Power Generation as Smart Baseload Power Source; Future Power System Created by Smart Aggregation by IoT/AI," Nikkan Kogyo Shimbun, Ltd., Mar. 20, 2019, p. 74-p. 77.

Genshiro Kitagawa, "Introduction to Time Series Analysis," Iwanami Shoten, Publishers, Feb. 24, 2005, p. 66-p. 69.

Baodan Cui et al., "Short-Term Photovoltaic Power Combination Forecasting Method with Time-Varying Weights", 2022 4th International Conference on Smart Power & Internet Energy Systems (SPIES), pp. 2003-2008, IEEE, 2022.

Weigang Zhao et al., "Combining forecasts of electricity consumption in China with time-varying weights updated by a high-order Markov chain model", Omega 45, 2014, pp. 80-91, Elsevier Ltd.

* cited by examiner

ENERGY PREDICTION DEVICE, ENERGY PREDICTION METHOD, AND ENERGY PREDICTION PROGRAM

CROSS REFERENCE TO RELATED APPLICATIONS

This patent application claims the benefit of foreign priority to Japanese Patent Application No. JP 2022-198572 filed on Dec. 13, 2022, the contents of which are incorporated by reference herein in their entirety.

TECHNICAL FIELD

The present disclosure relates to an energy prediction device, an energy prediction method, and an energy prediction program.

BACKGROUND

In the related art, prediction of renewable energy or prediction of energy demand has been studied. For example, Japanese Unexamined Patent Publication No. 2022-121028 discloses a system that prepares a power-generation conversion model based on result values of meteorological elements and a result value of an amount of renewable energy generated in the past and calculates a predicted value of an amount of renewable energy that will be generated in the future by inputting predicted values of the meteorological elements in the future to the power-generation conversion model. Japanese Unexamined Patent Publication No. 2022-84328 discloses a system that generates a demand prediction model indicating a relationship between fluctuation factor data and power demand data for each of a plurality of customer groups based on training data including result data of fluctuation factors of power demand and result data of power demand. Japanese Patent No. 6915156 discloses a device that constructs a prediction model for predicting an angular frequency coefficient with a Fourier transformation result of result data of power demand and result data as inputs and calculates power demand prediction data by performing an inverse Fourier transform on coefficient prediction data calculated by inputting forecast data to the prediction model. Japanese Patent No. 7062144 discloses a device that weighted-averages and blends a plurality of power-demand predicted values on a prediction target date predicted using a plurality of prediction models at a predetermined ratio and acquires a power-demand predicted value on the prediction target date. Japanese Patent No. 5734325 discloses a system that acquires amounts of predicted electric power in the past for each of a plurality of prediction means for calculating an amount of electric power and selects one prediction means with a smaller error based on the amount of predicted electric power in the past and an amount of result electric power in the past. Japanese Patent No. 7075772 discloses a device that calculates predicted values by methods using a plurality of prediction methods, calculates a weight for each prediction method based on an error from a power result value on a specific date, and calculates a power-demand predicted value of consumers based on the predicted values by methods and the weights. Japanese Patent No. 6705716 discloses a system that prepares a prediction expression through multiple regression analysis based on conditions such as temperature and time and past result values and predicts power demand for each time period using the prediction expression.

SUMMARY

There is desire for further enhancement in prediction accuracy of a predicted value of energy. The present disclosure describes a technique that can enhance prediction accuracy of a predicted value of energy.

An energy prediction device according to an aspect of the present disclosure performs: acquiring a plurality of temporary predicted values of energy which are predicted by a plurality of different prediction methods; and calculating a predicted value of energy by changing a proportion of at least one temporary predicted value out of the plurality of temporary predicted values according to a prediction time and blending the plurality of temporary predicted values.

According to the present disclosure, it is possible to provide a technique that can enhance prediction accuracy of a predicted value of energy.

DETAILED DESCRIPTION

Figure 1:
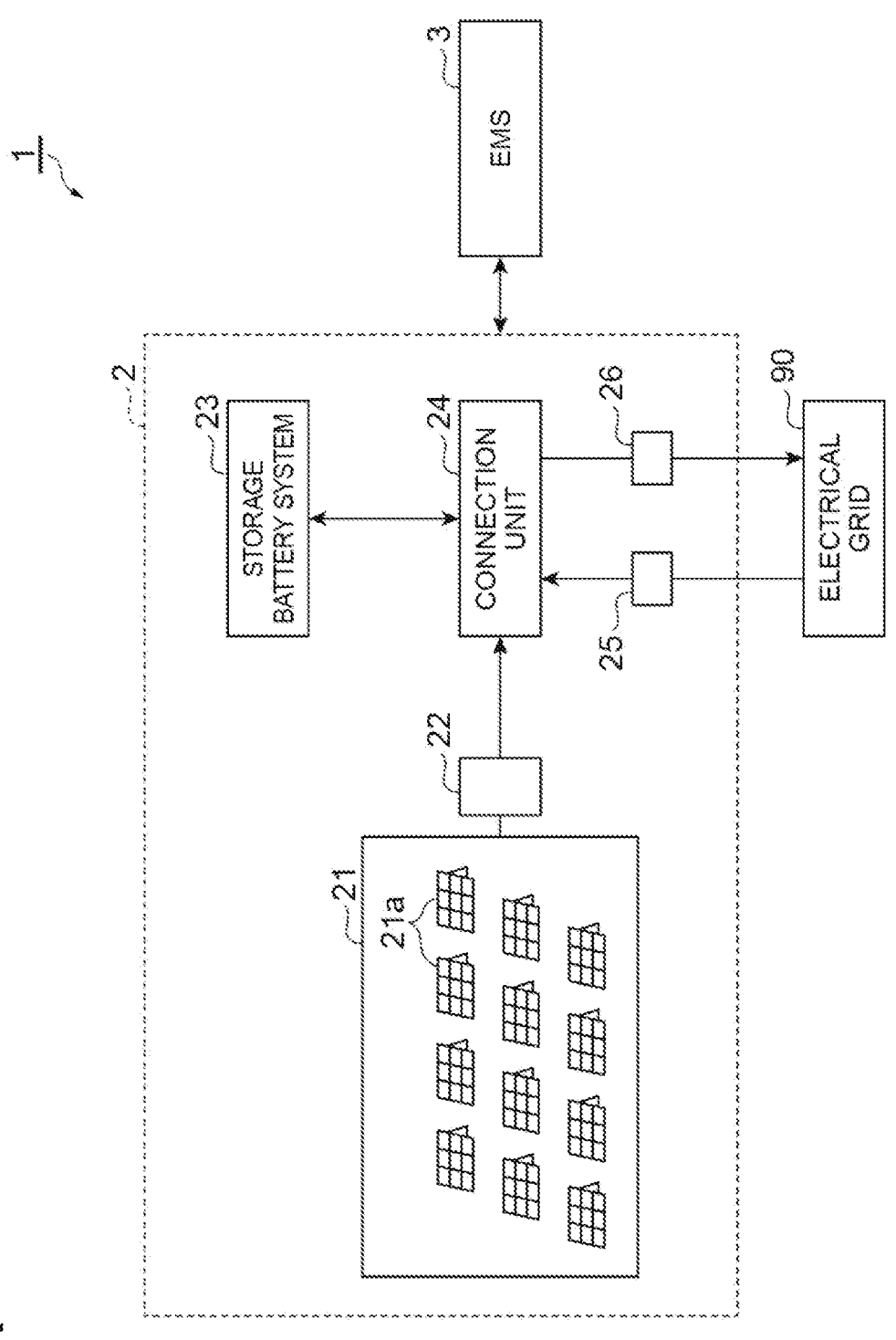
FIG. 1 is diagram schematically illustrating a power supply system.

An energy prediction device according to an aspect of the present disclosure performs: acquiring a plurality of temporary predicted values of energy which are predicted by a plurality of different prediction methods; and calculating a predicted value of energy by changing a proportion of at least one temporary predicted value out of the plurality of temporary predicted values according to a prediction time and blending the plurality of temporary predicted values.

An energy prediction method according to another aspect of the present disclosure includes: a step of acquiring a plurality of temporary predicted values of energy which are predicted by a plurality of different prediction methods; and a step of calculating a predicted value of energy by changing a proportion of at least one temporary predicted value out of the plurality of temporary predicted values according to a prediction time and blending the plurality of temporary predicted values.

An energy prediction program according to another aspect of the present disclosure causes a computer to perform: a step of acquiring a plurality of temporary predicted values of energy which are predicted by a plurality of different prediction methods; and a step of calculating a predicted value of energy by changing a proportion of at least one temporary predicted value out of the plurality of temporary predicted values according to a prediction time and blending the plurality of temporary predicted values.

In the energy prediction device, the energy prediction method, and the energy prediction program, a predicted value of energy is calculated based on a plurality of temporary predicted values of energy which are predicted using a plurality of different prediction methods. At this time, the plurality of temporary predicted values are blended while changing distribution proportions of the plurality of temporary predicted values according to the prediction time. Here, prediction accuracy of the predicted value of energy can change according to the prediction time. By combining the temporary predicted values based on the plurality of different prediction methods according to the prediction time, it is possible to enhance prediction accuracy of the predicted value of energy in comparison with a case in which a single prediction method is used. At least one temporary predicted value out of the plurality of temporary predicted values may be calculated based on a prediction method using a result value of energy. By reflecting the temporary predicted value based on the result value of energy in the predicted value, it is possible to enhance prediction accuracy of the predicted value of energy.

The plurality of temporary predicted values may be blended such that a proportion of the temporary predicted value calculated based on the prediction method using the result value of energy becomes dominant from a current time to a predetermined future time. A nearest future time can be a prediction period in which prediction accuracy of the temporary predicted value based on the result value of energy is high or a prediction period in which the prediction accuracy is expected to be high. By making the proportion of the temporary predicted value based on the result value of energy dominant from the current time to a predetermined future time, it is possible to further enhance prediction accuracy of the predicted value of energy.

The energy may be electric power generated through photovoltaic power generation. At least one temporary predicted value out of the plurality of temporary predicted values may be calculated based on a prediction method using weather forecast data. By reflecting the temporary predicted value based on the weather forecast data in the predicted value of electric power generated through photovoltaic power generation, it is possible to enhance prediction accuracy of the predicted value of energy.

The plurality of temporary predicted values may be blended such that a proportion of the temporary predicted value calculated based on the prediction method using the weather forecast data becomes dominant after a predetermined future time. The period from the current time to a distant future time can be a prediction period in which prediction accuracy of the temporary predicted value based on the weather forecast data is high or a prediction period in which the prediction accuracy is expected to be high. By making the proportion of the temporary predicted value based on the weather forecast data dominant after the future time distant from the current time, it is possible to further enhance prediction accuracy of the predicted value of energy.

A temporary predicted value upper limit and a temporary predicted value lower limit of each of the plurality of temporary predicted values may be additionally acquired, and a prediction error span of the predicted value of energy may be calculated by blending the temporary predicted value upper limits and the temporary predicted value lower limits of the plurality of temporary predicted values according to proportions of the plurality of temporary predicted values. By calculating the prediction error span, it is possible to improve convenience for a user who uses the predicted value of energy.

The plurality of prediction methods may differ in an algorithm used for prediction. Since the plurality of prediction methods differ in an algorithm, it is possible to enhance prediction accuracy of the predicted value of energy.

The plurality of prediction methods may differ in a data resource used for prediction. Temporal features of different data resources can be reflected in prediction accuracy of the predicted value. Accordingly, it is possible to enhance prediction accuracy of the predicted value of energy.

The plurality of prediction methods may differ in a prediction period. Since the plurality of prediction methods differ in a prediction period, it is possible to enhance prediction accuracy of the predicted value of energy. For example, a temporary predicted value based on a prediction period from the current time to a first future time and a temporary predicted value based on a prediction period from the current time to a second future time subsequent to the first future time are combined. In this case, it is possible to enhance prediction accuracy of the predicted value of energy from the first future time to the second future time.

The plurality of prediction methods may differ in the number of predicted values in a prediction period. Since the plurality of prediction methods differ in the number of predicted values (a prediction score), it is possible to enhance prediction accuracy of the predicted value of energy. For example, a temporary predicted value based on a prediction score at intervals of 30 minutes and a temporary predicted value based on a prediction score at intervals of 1 hour are combined. Since features based on the time intervals are reflected in the temporary predicted values, it is possible to enhance prediction accuracy of the predicted value of energy.

Hereinafter, embodiments of the present disclosure will be described in detail with reference to the accompanying drawings. In description with reference to the drawings, the same elements will be referred to by the same reference signs, and repeated description thereof will be omitted.
[Power Supply System]

A power supply system according to the present disclosure calculates a predicted value of energy based on a plurality of temporary predicted values of energy predicted using a plurality of prediction methods. For example, the power supply system is applied to prediction of electric power generated by a photovoltaic power generation facility in a microgrid. In the present disclosure, the unit of a predicted value may be kW or may be kWh. For example, the predicted value of generated electric power is used for charging/discharging optimization of a storage battery system. Charging/discharging optimization involves planning an amount of charging/discharging electric power of the storage battery system such that amounts of electric power in a microgrid and an electrical grid are economically optimized. An optimization target is not limited to charging/discharging electric power of storage batteries. For example, the predicted value may be used to determine power consumption in water-electrolysis hydrogen generators such that hydrogen production costs are economically optimized. When a prediction target is power demand, the predicted value may be used to determine power demand such that an amount of generated electric power or a start/stop time of a power generator such as a diesel engine is economically optimized. Predicted values of photovoltaic power generation and power demand may be used to make an operation plan of a device group including storage batteries, hydrogen generators, and power generators. The usage of the predicted values is not limited to making an operation plan of the devices, and the predicted values may be used for bidding in a power market, application for self-consignment of electric power, determination of instructions of a demand response for avoiding poorness in electric power, or the like. The predicted values may be used in the form of a predicted value delivery service of providing the predicted values to a third party such as a microgrid operator. In this case, the usage of the predicted values is not particularly significant to the provider of the predicted values.

FIG. 1 is a diagram schematically illustrating a configuration of a power supply system 1 according to an embodiment. The power supply system 1 includes a microgrid 2 and an energy management system (EMS) 3. The microgrid 2 and the EMS 3 are communicatively connected to each other. The EMS 3 may be an element of the microgrid 2.

The microgrid 2 is connected to an external electrical grid 90. The microgrid 2 can transmit and receive electric power to and from the electrical grid 90. The microgrid 2 includes a photovoltaic power generation facility 21, a generated power measuring unit 22, a storage battery system 23, a connection unit 24, a received power measuring unit 25, and a transmitted power measuring unit 26.

The photovoltaic power generation facility 21 is an example of a renewable energy generator. The photovoltaic power generation facility 21 is a facility that generates electric power through photovoltaic (PV) power generation. The photovoltaic power generation facility 21 includes a solar panel 21a and a power conditioner (power conditioning system: PCS) which is not illustrated. The PCS converts DC electric power to AC electric power. The photovoltaic power generation facility 21 is connected to the connection unit 24. The photovoltaic power generation facility 21 outputs generated electric power to the connection unit 24.

The generated power measuring unit 22 measures an amount of electric power actually generated in the photovoltaic power generation facility 21. The method of measuring the amount of actually generated electric power is not particularly limited. For example, the generated power measuring unit 22 may measure electric power output from the photovoltaic power generation facility 21 to the connection unit 24.

The storage battery system 23 is an example of an energy storage device. The storage battery system 23 includes storage batteries. Each storage battery is a secondary battery such as a lithium-ion battery, a lead storage battery, or a redox flow battery. Each storage battery may be an energy storage device such as a flywheel, a compressed air energy storage (CAES) facility, or a large-capacity capacitor. The storage battery system 23 includes a storage battery PCS that converts DC electric power of a storage battery to AC electric power and a device that monitors a residual capacity of a storage battery. The storage battery system 23 can serve as a power conditioning unit for adjusting transmission of electric power between the microgrid 2 and the outside.

The connection unit 24 is, for example, a power distribution board. The connection unit 24 controls distribution of electric power to the storage battery system 23 and the electrical grid 90. For example, the connection unit 24 controls distribution of electric power in accordance with an instruction from the EMS 3.

The received power measuring unit 25 measures electric power received from the external electrical grid 90. The transmitted power measuring unit 26 measures electric power transmitted to the external electrical grid 90.

First Embodiment

Figure 2:
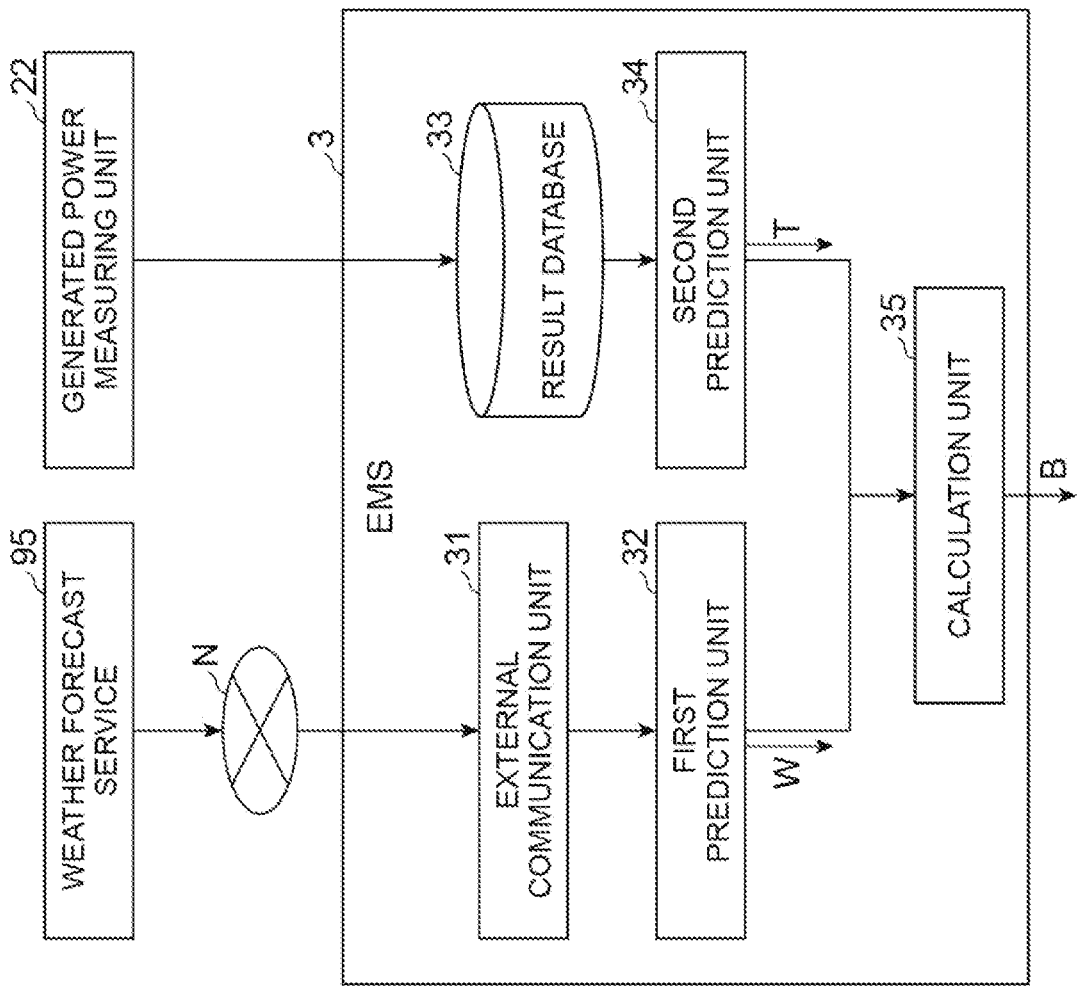
FIG. 2 is a block diagram illustrating a functional configuration of an EMS according to a first embodiment.

FIG. 2 is a block diagram illustrating a functional configuration of an EMS 3 according to a first embodiment. The EMS 3 serves as an energy prediction device according to the present disclosure. The EMS 3 is communicatively connected to a weather forecast service 95 via a network N such as the Internet. The EMS 3 is communicatively connected to the generated power measuring unit 22 of the microgrid 2.

The weather forecast service 95 periodically calculates weather data based on weather satellite data or observation data from various places using weather simulation performed by a supercomputer, numerical adjustment performed by artificial intelligence, or the like. Examples of the weather data include temperature, humidity, wind speed, wind direction, rainfall, snowfall, snow depth, total solar radiation, and cloud quantity, and the present disclosure is not limited thereto. For example, the weather forecast service 95 calculates weather data of about one day to three days in the future in an area including latitude and longitude of the microgrid 2.

The EMS 3 includes an external communication unit 31, a first prediction unit 32, a result database 33, a second prediction unit 34, and a calculation unit 35. In FIG. 2, only functions associated with prediction of energy according to the present disclosure out of various functions of the EMS 3 are illustrated. That is, in FIG. 2, functions such as a user interface, a ledger function, a function of communicating with the storage battery system 23, and a function of making a plan of charging/discharging electric power of the storage battery are not illustrated.

The external communication unit 31 acquires, for example, weather forecast data from the weather forecast service 95. The external communication unit 31 periodically acquires weather forecast data based on a communication protocol such as a file transfer protocol (FTP) or a hypertext transfer protocol (HTTP). The weather forecast data can be acquired, for example, one time per day, four times per day, or 48 times per day, but the present disclosure is not limited thereto.

The first prediction unit 32 calculates a temporary predicted value of energy using a first prediction method. For example, the first prediction method may be an energy prediction method using weather forecast data. The first prediction unit 32 may output a temporary predicted value upper limit and a temporary predicted value lower limit in addition to the temporary predicted value. The temporary predicted value upper limit and the temporary predicted value lower limit define, for example, a range with an upper limit and a lower limit in which a value to be predicted is included with a predetermined certainty (for example, 80%).

The result database 33 is a non-transitory storage medium or a storage device that stores a result value of generated electric power. The result database 33 stores a result value of generated electric power measured by the generated power measuring unit 22 and time in correlation. That is, the result database 33 stores result values of generated electric power previous to a current time in a time series. The result database 33 may be constructed as a single database or may be constructed as a set of a plurality of databases. The installation place of the result database 33 is not particularly limited. For example, the result database 33 may be provided in a computer system other than the power supply system 1.

The second prediction unit 34 calculates a temporary predicted value of energy using a second prediction method. For example, the second prediction method may be an energy prediction method using a result value of generated electric power. The second prediction unit 34 may output a temporary predicted value upper limit and a temporary predicted value lower limit in addition to the temporary predicted value.

The calculation unit 35 acquires a plurality of temporary predicted values of energy predicted using a plurality of different prediction methods. When a plurality of prediction methods are different, it may mean one or more of different prediction algorithms, different data resources, different prediction periods, and different prediction scores which are the number of predicted values in a prediction period. The prediction period is a time range in which a predicted value is acquired and is also referred to as a prediction section.

For example, when a plurality of prediction methods use the same algorithm and different data resources, they are a plurality of different prediction methods. For example, the external communication unit 31 of the EMS 3 may acquire weather forecast data from the weather forecast service 95 and a weather forecast service other than the weather forecast service 95. The first prediction unit 32 may calculate a plurality of temporary predicted values W1 and W2 based on the weather forecast data. For example, the first prediction method may be a prediction method of which the prediction period is more distant from the current time than that of the second prediction method. In other words, the second prediction method may be a prediction method of which the prediction period is closer to the current time than that of the first prediction method. For example, the first prediction method may be a prediction method of which the prediction score is smaller than that of the second prediction method. In other words, the second prediction method may be a prediction method of which the prediction score is larger than that of the first prediction method. The prediction score can also be replaced with a resolution of the prediction period. The prediction score may be expressed, for example, by an interval of 30 minutes or an interval of 1 hour.

The calculation unit 35 calculates a predicted value of energy by changing a proportion of at least one temporary predicted value of the plurality of temporary predicted values according to a prediction time and blending the plurality of temporary predicted values. For example, the calculation unit 35 calculates a predicted value B of energy based on a temporary predicted value W of energy predicted by the first prediction unit 32 and a temporary predicted value T of energy predicted by the second prediction unit 34. At this time, the calculation unit 35 changes distribution proportions of the temporary predicted values W and T according to the prediction times. In other words, the calculation unit 35 calculates the predicted value B of energy using a proportion calculation function with a prediction time as an independent variable and with a distribution proportion as a dependent variable.

The calculation unit 35 may blend prediction errors. For example, the calculation unit 35 may additionally acquire a temporary predicted value upper limit and a temporary predicted value lower limit of each of the plurality of temporary predicted values. The calculation unit 35 may calculate a prediction error span of the predicted value B of energy by blending the temporary predicted value upper limits and the temporary predicted value lower limits according to the proportions of the plurality of temporary predicted values.

[First Prediction Method]

The first prediction unit 32 calculates the temporary predicted value W according to a prediction method using weather forecast data as the first prediction method. The first prediction unit 32 extracts weather data of the prediction period from the weather forecast data. An example of the weather data includes a solar radiation and a temperature, but the present disclosure is not limited thereto. The first prediction unit 32 calculates the temporary predicted value W by Expression (1) using the solar radiation and the temperature.

[Expression 1]

$$y^{W}(t_i^{W}) = K_{total} \times K_{PT}(t_i^{W}) \times P_{AS} \times \frac{I(t_i^{W})}{1000} \tag{1}$$

In Expression (1), $y^{W}$ is the temporary predicted value W [kW]. $t_i^{W}$ is a prediction time of the temporary predicted value W (where i=1, 2, . . . , $N^{W}$). $N^{W}$ denotes a prediction score of the temporary predicted value W. $K_{total}$ is a total correction factor [-]. The total correction factor is a parameter indicating all efficiency decreases other than an efficiency decrease due to a temperature increase. Examples of causes of the efficiency decreases include cell deterioration, contamination of an array surface, a circuit loss, and a conversion loss of the PCS.

$K_{total}$ generally has a value in a range of from 0.6 to 0.9. $K_{PT}$ is a temperature correction factor [-]. The temperature correction factor indicates an efficiency decrease due to a temperature increase. $K_{PT}$ depends on a cell temperature $T_{cell}$ [° C.] and is calculated by Expression (2).

[Expression 2]

$$K_{PT}(t_i) = 1 + \frac{\alpha_{Pmax}}{100}(T_{cell}(t_i) - 25) \tag{2}$$

In Expression (2), $\alpha_{Pmax}$, is a maximum-output temperature coefficient [%]. $\alpha_{Pmax}$ varies depending on a type of a cell crystal and takes, for example, a negative value of about −0.4 to −0.5 according to a crystal system. The cell temperature $T_{cell}$ [° C.] may be separately calculated from weather prediction data (such as a temperature, a solar radiation, or a wind speed) or may be the same as the temperature. Here, it is assumed that $T_{cell}$ [° C.] is the same as the temperature.

In Expression (1), $P_{AS}$ is a PV array output (a total PV array capacity) [kW] in a standard state. I is a total solar radiation [W/m²] of the weather forecast data. A value (a slope solar radiation) obtained by separating a solar radiation into a direct component and a scattered component using an Erbs method or the like and converting the separated components to a slope solar radiation of a PV array may be used as the total solar radiation.

[Second Prediction Method]

The second prediction unit 34 calculates a temporary predicted value T according to a prediction method using a result value of generated electric power as the second prediction method. The second prediction unit 34 acquires result values in a predetermined past period from the result database 33. Examples of the result values in the predetermined past period include result values corresponding to 3 hour as an average at intervals of 30 minutes, but the present disclosure is not limited thereto. The result values in the predetermined past period can be referred to as time-series data. The second prediction unit 34 calculates the temporary predicted value T using a prediction model using the time-series data. Examples of the prediction model include a sustaining model, an autoregressive model (an AR model), and a clear-day power generation model, but the present disclosure is not limited thereto.

Figure 3:
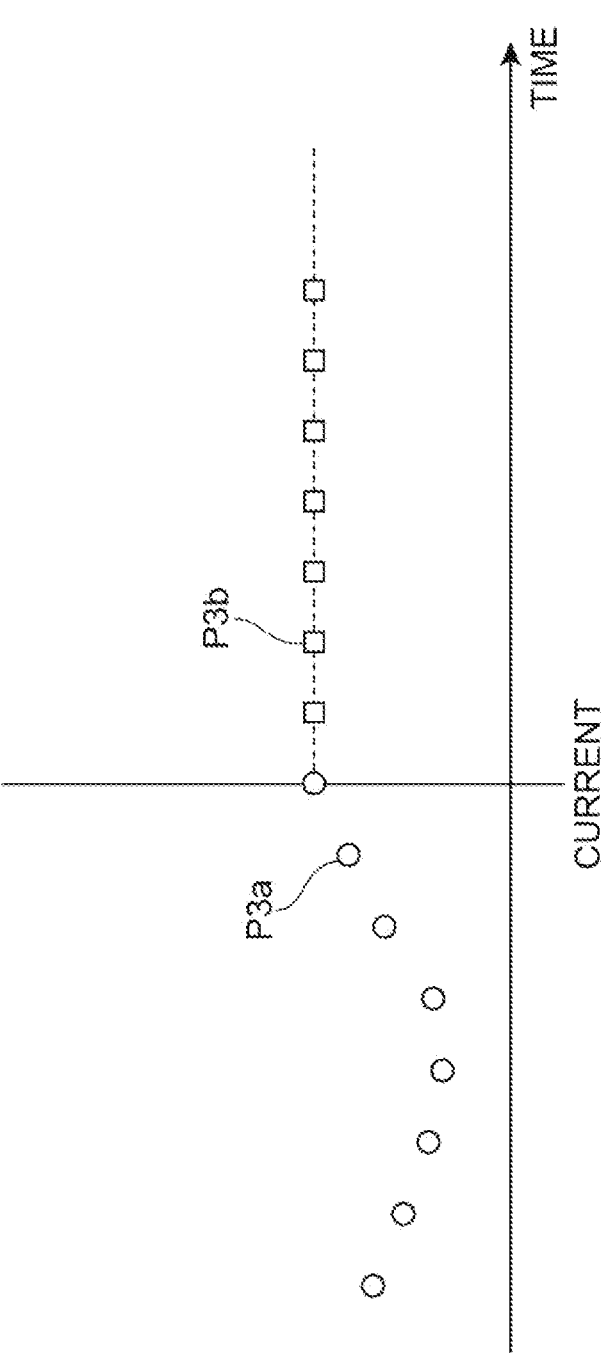
FIG. 3 is a conceptual diagram illustrating prediction using a sustaining model.

FIG. 3 is a conceptual diagram illustrating prediction using a sustaining model. FIG. 3 illustrates result values P3*a* and predicted values P3*b*. The sustaining model is a prediction model based on the assumption that a future value is the same as a current value. In the sustaining model, all the result values P3*a* other than the final value are ignored. For example, the second prediction unit 34 sets the temporary predicted value T to the final value (the newest value) of the result values P3*a* in the whole prediction period subsequent to the current time. The sustaining model is used as a simplest method and is effective particularly when a desired prediction period is short. The sustaining model is also used as a reference prediction method at the time of evaluation of accuracy of another prediction method.

Figure 4:
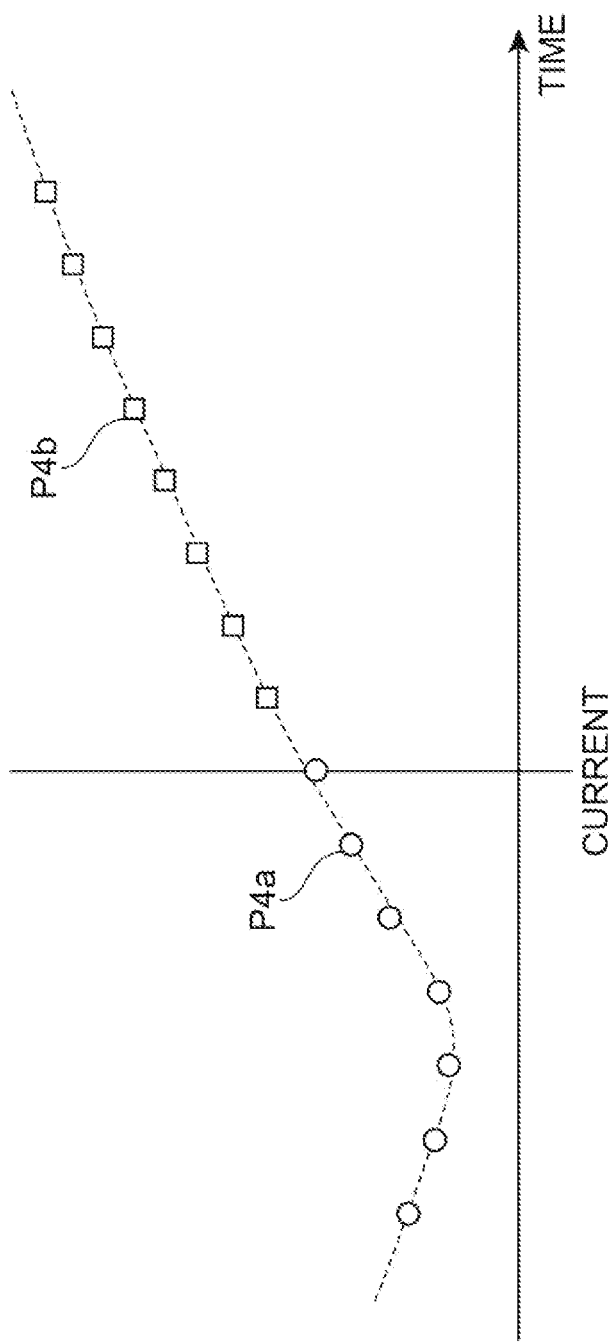
FIG. 4 is a conceptual diagram illustrating prediction using an AR model.

FIG. 4 is a conceptual diagram illustrating prediction using an AR model. FIG. 4 illustrates result values P4*a* and predicted values P4*b*. With the AR model, it can be expected to enhance prediction accuracy of a value with a trend of high auto-regression (periodicity or vibration) such as wind power generation or power demand. For example, power demand has a trend of periodicity of 24 hours. When time-series data $\{yi\}$ (where $i=1, \ldots, N$) is given, the AR model expresses the time-series data $yi$ by Expression (3).

[Expression 3]

$$y_n = \sum_{i=1}^{m} a_i y_{n-i} + v_n \qquad (3)$$

In Expression (3), m is a degree of auto-regression. $a_i$ is a coefficient. $v_n$ is white noise conforming to a normal distribution with an average of 0 and a variance of $\sigma^2$. The degree m of the AR model and the coefficient $a_i$ (where $i=1, \ldots, m$) are determined such that the Akaike Information Criterion (AIC) is minimized with respect to the time-series data $\{yi\}$ (where $i=1, \ldots, N$) of the result values. The AIC is a kind of statistic. A model with a smaller AIC can be construed to be a "model with balance between complexity of a model and fidelity to data." The AIC of the AR model with the degree m is expressed by Expression (4).

[Expression 4]

$$AIC=-2(\text{maximum logarithmic likelihood})+2(m+1) \qquad (4)$$

The second prediction unit 34 predicts an amount of PV generated electric power in a prediction period using the acquired AR model. In Expression (3), $v_n$ of the AR model is generally handled as zero. For example, the predicted value $y^\wedge_{n+1}$ at a next time is calculated by Expression (5) using the time-series data $\{yi\}$ (where $i=1, \ldots, N$) of the result values.

[Expression 5]

$$\hat{y}_{n+1} = \sum_{i=1}^{m} a_i y_{n+1-i} \qquad (5)$$

In addition, the predicted value $y^\wedge_{n+2}$ at a next time is calculated by Expression (6).

[Expression 6]

$$\hat{y}_{n+2} = a_1 \hat{y}_{n+1} + \sum_{i=2}^{m} a_i y_{n+2-i} \qquad (6)$$

The second prediction unit 34 predicts a future predicted value by repeating calculation of Expression (6). The final predicted value of the AR model may be limited to a range with a maximum value and a minimum value designated by a user of the EMS 3. Accordingly, it is possible to prevent the predicted values of the AR model from becoming excessively large or excessively small.

Figure 5:
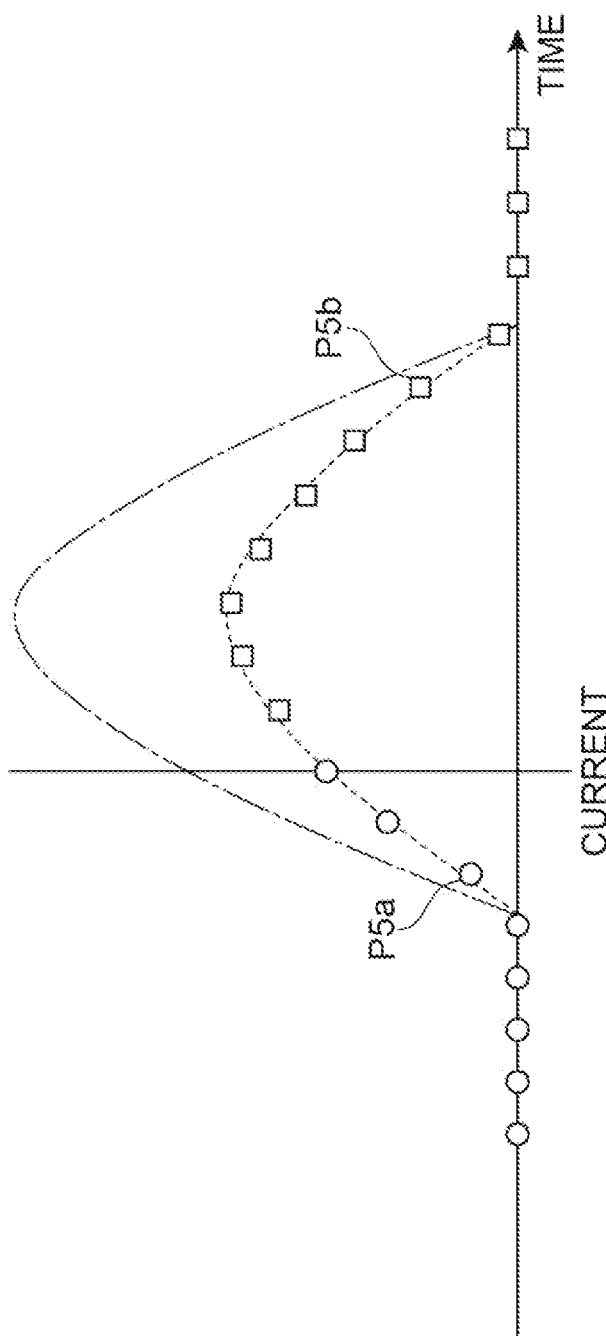
FIG. 5 is a conceptual diagram illustrating prediction using a clear-day power generation model.

FIG. 5 is a conceptual diagram illustrating prediction using a clear-day power generation model. FIG. 5 illustrates result values P5*a* and predicted values P5*b*. The clear-day power generation model is applied to only prediction of PV power generation. The clear-day power generation model is not applied to prediction of energy demand, prediction of wind power generation, and the like. With the clear-day power generation model, it is possible to ascertain a trend of PV power generation having features in sunrise and sunset. The clear-day power generation model is a model using a value obtained by conversion to PV electric power based on an extra-atmospheric solar radiation which is theoretically calculated. FIG. 5 illustrates PV electric power calculated theoretically by a dash-dotted line. The clear-day power generation model calculates future predicted values P5*b* with a ratio of PV electric power calculated theoretically and the result values P5*a* fixed. The second prediction unit 34 calculates a predicted value of PV electric power using Expression (7).

[Expression 7]

$$\hat{p}_{pv}(t \mid k) = \frac{p_{pv}^{real}(k)}{p_{pv}^{sunny}(k)} p_{pv}^{sunny}(t) \qquad (7)$$

In Expression (7), k is a current time. $p_{pv}^{real}(k)$ is PV electric power actually generated a time k. $p_{pv}^{sunny}(t)$ is clear-day PV electric power at time t. $p^\wedge_{pv}(t|k)$ is a predicted value of PV electric power at future time t predicted at current time k.

In Expression (7), $p_{pv}^{real}(k)/p_{pv}^{sunny}(k)$ can be considered to be an index similar to a cloudlessness index in calculation of a solar radiation. The clear-day PV generated power $p_{pv}^{sunny}(t)$ may be PV electric power which is calculated with an extra-atmospheric solar radiation on a horizontal plane as a total solar radiation on a horizontal plane using a method such as an Erbs method.

In the nighttime or the like, since $p_{pv}^{sunny}(k)$ is zero, $p_{pv}^{real}(k)/p_{pv}^{sunny}(k)$ is indefinite. When $p_{pv}^{sunny}(k)$ is sufficiently small, $p_{pv}^{real}(k)/p_{pv}^{sunny}(k)$ may be 0.5 or may not be used for blend in the calculation unit 35.

When $p^\wedge_{pv}(t|k)$ is equal to or less than zero, $p^\wedge_{pv}(t|k)$ may be zero. When $p^\wedge_{pv}(t|k)$ is equal to or greater than a rated value of PV electric power, $p^\wedge_{pv}(t|k)$ may be limited to a rated value.

[Blend]

Figure 6:
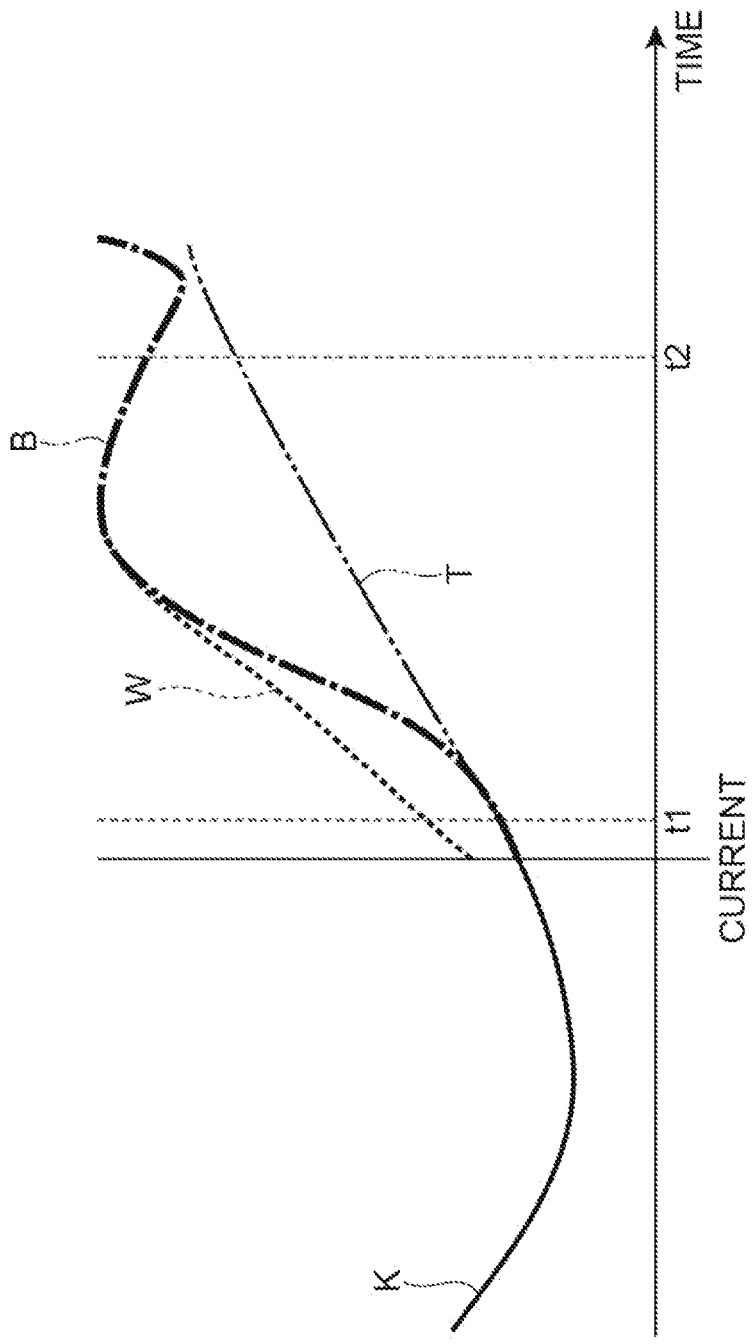
FIG. 6 is a diagram illustrating the concept of blending temporary predicted values.

FIG. 6 is a diagram illustrating the concept of blend of temporary predicted values. FIG. 6 illustrates result values K of energy previous to the current time and predicted values of energy subsequent to the current time. The result values K are, for example, generated power measured by the generated power measuring unit 22. In FIG. 6, a temporary predicted value W, a temporary predicted value T, and a predicted value B are illustrated as the predicted values of energy in the future.

The calculation unit 35 changes distribution proportions of the temporary predicted value W and the temporary predicted value T according to the prediction time and calculates the predicted value B. For example, the calculation unit 35 gives priority to the temporary predicted value T as a predicted value in the future close to the current time in the prediction period of the predicted value B. The calculation unit 35 gives priority to the temporary predicted value W as a predicted value in the future distant from the current time in the prediction period of the predicted value B.

For example, at time t1 in the future close to the current time, the calculation unit 35 increases the distribution proportion of the temporary predicted value T, decreases the distribution proportion of the temporary predicted value W, and calculates the predicted value B. At time t2 in the future distant from the current time, the calculation unit 35 decreases the distribution proportion of the temporary predicted value T, increases the distribution proportion of the temporary predicted value W, and calculates the predicted value B. In other words, the calculation unit 35 calculates the predicted value B to be closer to the temporary predicted value T than the temporary predicted value W as it gets closer to the current time. The calculation unit 35 calculates the predicted value B to be closer to the temporary predicted value W than the temporary predicted value T as it gets more distant from the current time.

The number of pieces of data of the predicted values X (X=W, T, B) is defined as $N^X$. The prediction time is defined as follows.

$$\{t_k^X\}_{k=1}^{N^X}$$

The predicted value is defined as $y^X$. It is assumed that the temporary predicted value W and the temporary predicted value T are given and only the prediction time $\{t_k^B\}_{k=1}^{N}$ is given for the predicted value B. Intervals of the prediction times of the predicted value B may not be fixed. In the future close to the current time, the intervals of the prediction times may be set to be shorter. In the future far from the current time, the intervals of the prediction times may be set to be longer. The intervals of the prediction times may be set to, for example, an interval of 5 minutes in 1 hour, an interval of 30 minutes in from 1 hour later to 1 day, and an interval of 3 hours from 1 day later to 3 days. The prediction times may differ in all the temporary predicted value W, the temporary predicted value T, and the predicted value B.

The calculation unit 35 calculates a value $y^B(t_k^B)$ of the predicted value B in a next step. A resampling process based on linear interpolation is performed such that the prediction time of the temporary predicted value W is $\{t_k^B\}_{k=1}^{N}$. When the value is extrapolated, a first or last value of the temporary predicted value W is used. That is, when $t_i^B < t_1^W$ is satisfied, Expression (8) is used.

[Expression 8]

$$y^W(t_i^B) = y^W(t_1^W) \qquad (8)$$

$$t_i^B > t_{N^W}^W$$

In this case, Expression (9) is used.

[Expression 9]

$$y^W(t_i^B) = y^W(t_{N^W}^W) \qquad (9)$$

The calculation unit 35 performs the same resampling process on the temporary predicted value T. The calculation unit 35 calculates the predicted value B based on Expression (10) using the temporary predicted value W and the temporary predicted value T subjected to the resampling process.

[Expression 10]

$$y^B(t_i^B) = \alpha(t_i^B)y^T(t_i^B) + (1 - \alpha(t_i^B))y^W(t_i^B) \qquad (10)$$

In Expression (10), $\alpha$ is a blend proportion function. The blend proportion function is a function for determining a distribution proportion of a temporary predicted value. $\alpha$ is calculated by Expression (11).

[Expression 11]

$$\alpha(t_i^B) = e^{-\frac{1}{\lambda}(t_i^B - t^{end})} \qquad (11)$$

In Expression (11), $\lambda$ is a time constant designated by a user. $t^{end}$ is an end time of the given result values. When the first sampling time of the predicted value B and the final sampling time of the result value match, the predicted value B can be expressed as Expression (12).

[Expression 12]

$$y^B(t_1^B) = y^T(t^{end}) \qquad (12)$$

The predicted value B gradually approaches the temporary predicted value W as the prediction time goes ahead to the future. The gradual approach speed depends on the time constant $\lambda$. For example, at a time point of time $t^{end}+\lambda$, the temporary predicted value W of 63.8% and the temporary predicted value T of 36.2% are blended into the predicted value B. At a time point of time $t^{end}+2\lambda$, the temporary predicted value W of 86.5% and the temporary predicted value T of 13.5% are blended into the predicted value B. At a time point of time $t^{end}+5\lambda$, the temporary predicted value T of 1% or less is blended into the predicted value B.

Figure 7:
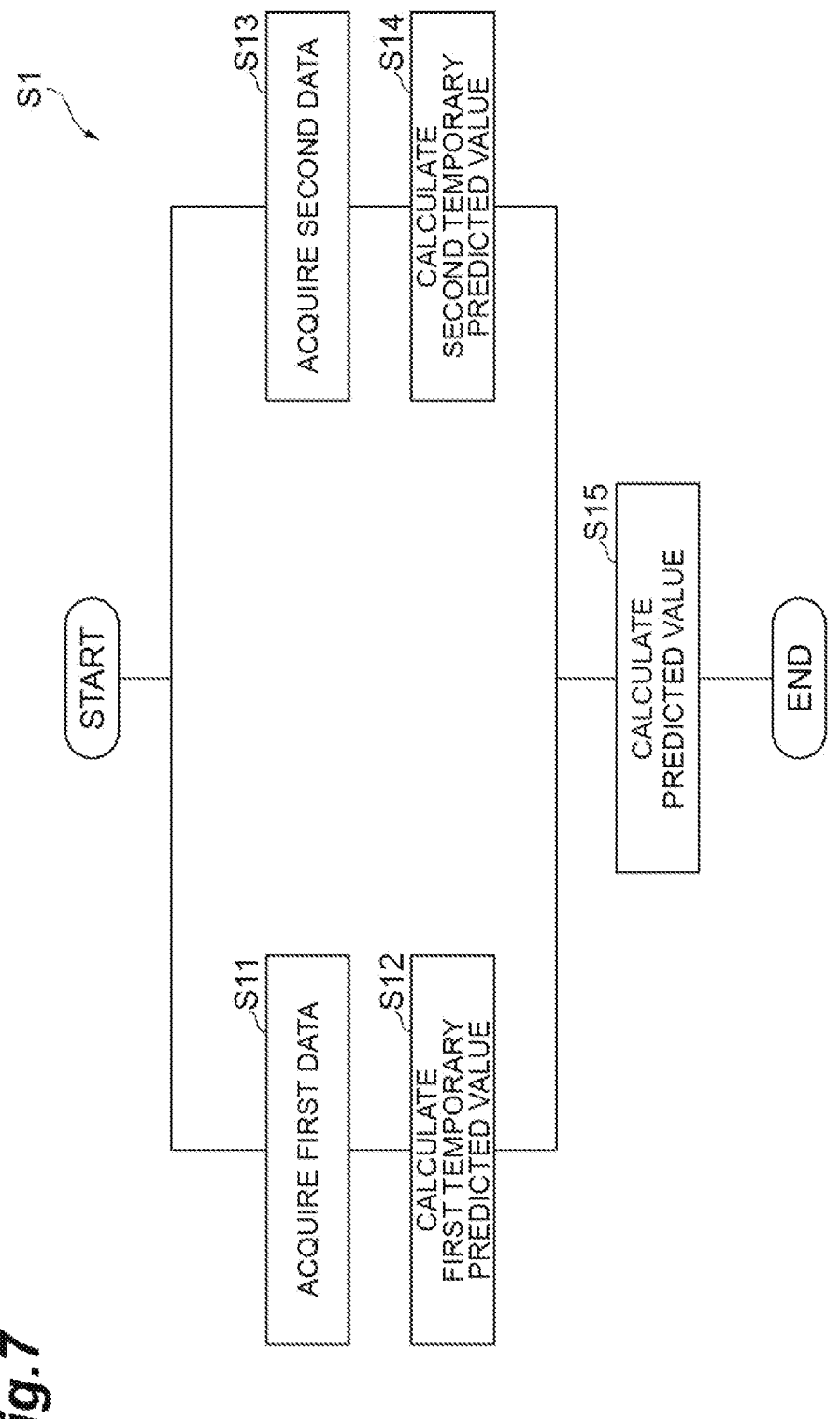
FIG. 7 is a flowchart illustrating an example of an energy prediction method.

The operation of the EMS 3 and an example of the energy prediction method will be described below with reference to FIG. 7. FIG. 7 is a flowchart illustrating an example of the operation of the EMS 3 as a process flow S1.

In Step S11, the EMS 3 acquires first data. For example, the external communication unit 31 acquires weather forecast data as the first data from the weather forecast service 95.

In Step S12, the EMS 3 calculates a first temporary predicted value of energy using a first prediction method. For example, the first prediction unit 32 calculates the temporary predicted value W as the first temporary predicted value based on the first prediction method using the weather forecast data. For example, the first prediction unit 32 calculates the temporary predicted value W using Expressions (1) and (2) and the like.

In Step S13, the EMS 3 acquires second data. For example, the second prediction unit 34 acquires a result value of generated power as the second data from the result database 33.

In Step S14, the EMS 3 calculates a second temporary predicted value of energy using a second prediction method. For example, the second prediction unit 34 calculates the temporary predicted value T as the second temporary predicted value based on the second prediction method using the result values of generated power. For example, the second prediction unit 34 calculates the temporary predicted value T using a prediction model such as a sustaining model, an AR model, or a clear-day power generation model. For example, Expressions (3) to (6) are used for the AR model. For example, Expression (7) is used for the clear-day power generation model.

In Step S15, the EMS 3 calculates a predicted value of energy by changing the proportion of at least one temporary predicted value out of a plurality of temporary predicted values according to the prediction time and blending the plurality of temporary predicted values. For example, the calculation unit 35 acquires a plurality of temporary predicted values (the first temporary predicted value and the second temporary predicted value) of energy predicted according to a plurality of different prediction methods. For example, the calculation unit 35 calculates the predicted value B of energy by changing the proportions of the first temporary predicted value and the second temporary predicted value according to the prediction time and blending the temporary predicted values. For example, the calculation unit 35 calculates the predicted value using Expressions (8) to (12) and the like.

In the process flow S1, Steps S11 and S12 and Steps S13 and S14 may be performed in parallel or may be performed in series. In Steps S12, S14, and S15, the EMS 3 may blend prediction errors. For example, in Step S12, the first prediction unit 32 may output a temporary predicted value upper limit and a temporary predicted value lower limit in addition to the temporary predicted value W. In Step S14, the second prediction unit 34 may output a temporary predicted value upper limit and a temporary predicted value lower limit in addition to the temporary predicted value T. In Step S15, the calculation unit 35 may additionally acquire a temporary predicted value upper limit and a temporary predicted value lower limit of each of the plurality of temporary predicted values W and T. The calculation unit 35 may calculate a prediction error span of the predicted value B of energy by blending the temporary predicted value upper limits and the temporary predicted value lower limits according to the proportions of the plurality of temporary predicted values W and T. For example, the calculation unit 35 may calculate the prediction error span using Expression (10). In Expression (10), the calculation unit 35 may apply the blend proportion function α to the temporary predicted value upper limit and the temporary predicted value lower limit of the temporary predicted value T. The calculation unit 35 may apply (1−α) to the temporary predicted value upper limit and the temporary predicted value lower limit of the temporary predicted value W.

Second Embodiment

Figure 8:
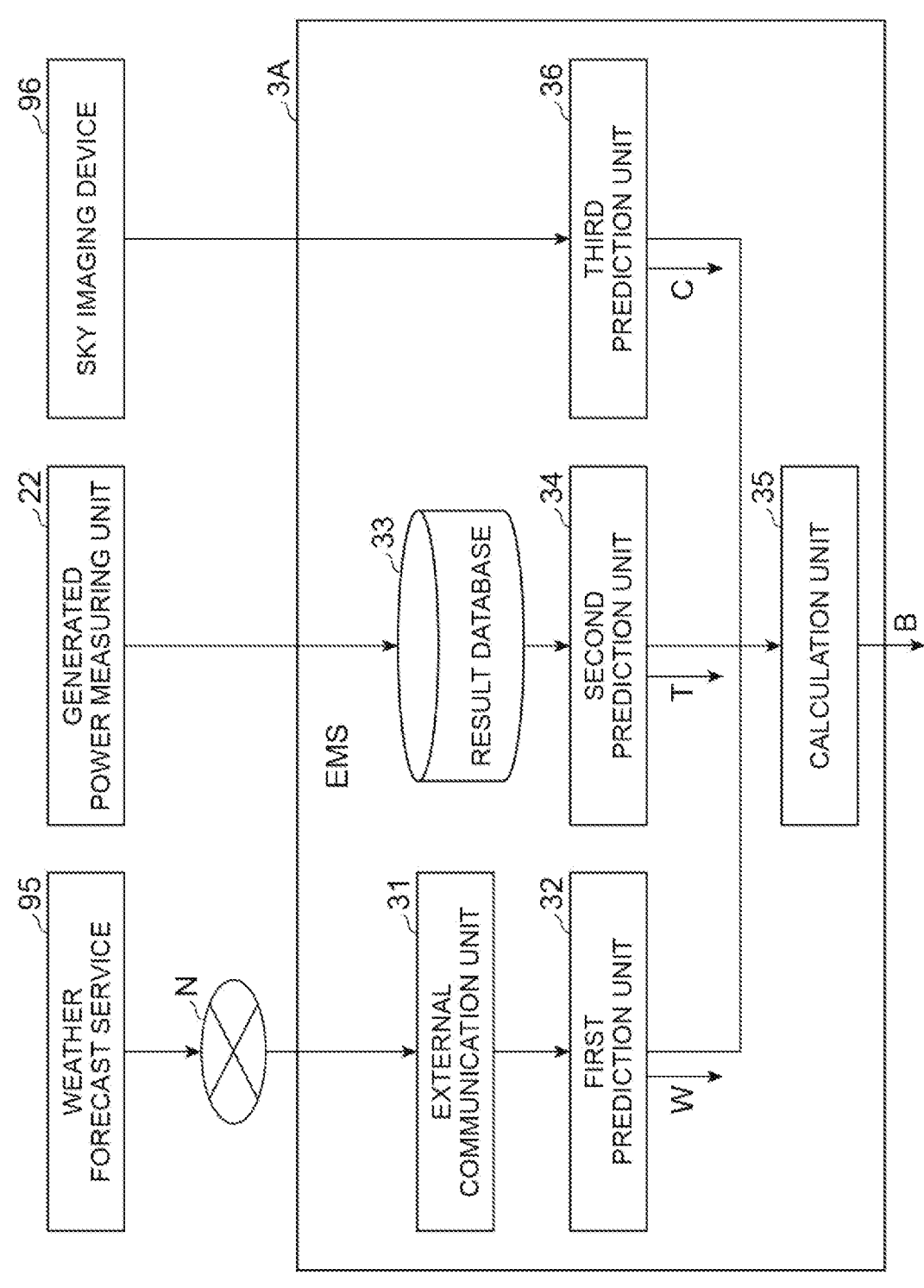
FIG. 8 is a block diagram illustrating a functional configuration of an EMS according to a second embodiment.

FIG. 8 is a block diagram illustrating a functional configuration of an EMS 3A according to a second embodiment. The EMS 3A serves as an energy prediction device similarly to the EMS 3. Differences between the EMS 3A and the EMS 3 will be mainly described below. The EMS 3A is different from the EMS 3 in that the EMS 3A is connected to a sky imaging device 96 imaging the sky (the total sky) and a third prediction unit 36 is provided. The EMS 3 blends two temporary predicted values, but the EMS 3A blends three temporary predicted values. The number of temporary predicted values to be blended may be three or more. The sky imaging device 96 may be, for example, a fish-eye camera or a device that acquires a satellite image.

The third prediction unit 36 calculates a temporary predicted value of energy using a third prediction method. For example, the third prediction method may be an energy prediction method using image data of the sky. The third prediction unit 36 may output a temporary predicted value upper limit and a temporary predicted value lower limit in addition to the temporary predicted value.

The third prediction unit 36 calculates a temporary predicted value C based on a prediction method using image data of the sky as the third prediction method. For example, the third prediction unit 36 acquires image data of the sky from the sky imaging device 96. The third prediction unit 36 calculates the temporary predicted value C of a solar radiation or PV electric power in the future using a prediction method using machine learning or deep learning based on fluctuation of an amount of cloud or the like from the image data of the sky.

The calculation unit 35 calculates a predicted value B based on the temporary predicted value W, the temporary predicted value T, and the temporary predicted value C. For example, the calculation unit 35 calculates the predicted value B using Expression (13).

[Expression 13]

$$y^B(t_i^B) = \frac{\alpha(t_i^B)}{\alpha(t_i^B) + \beta(t_i^B) + \gamma(t_i^B)} y^T(t_i^B) + \frac{\beta(t_i^B)}{\alpha(t_i^B) + \beta(t_i^B) + \gamma(t_i^B)} y^C(t_i^B) + \frac{\gamma(t_i^B)}{\alpha(t_i^B) + \beta(t_i^B) + \gamma(t_i^B)} y^W(t_i^B) \quad (13)$$

Figure 9A:
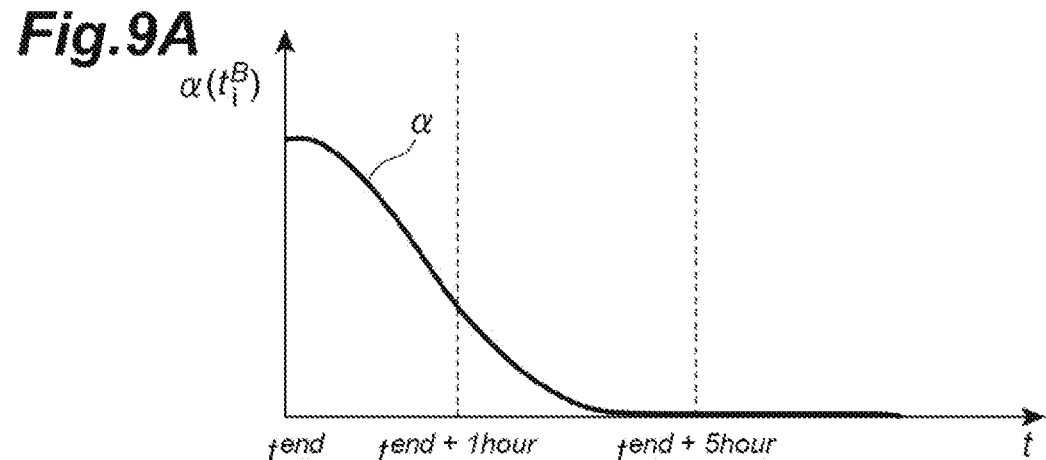
FIG. 9A is a conceptual diagram illustrating a blend proportion function $\alpha$.
Figure 9B:
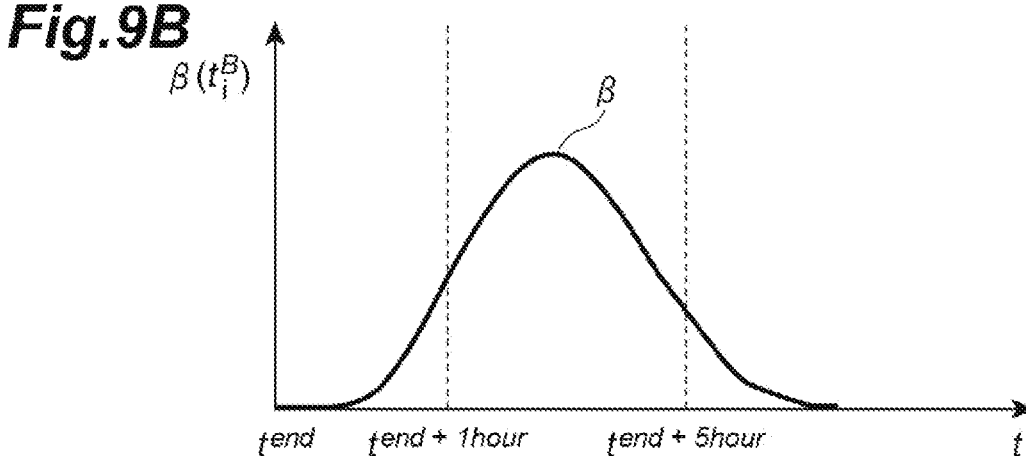
FIG. 9B is a conceptual diagram illustrating a blend proportion function $\beta$.
Figure 9C:
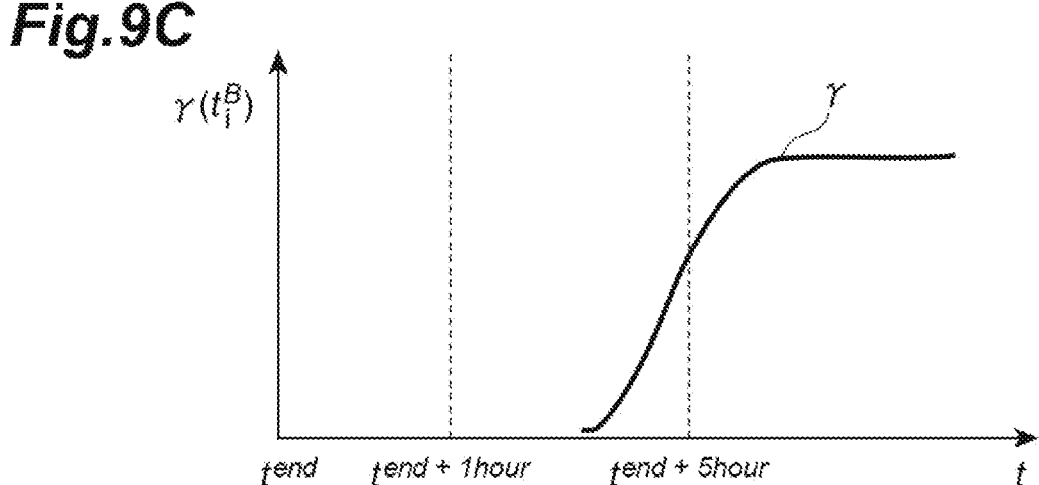
FIG. 9C is a conceptual diagram illustrating a blend proportion function $\gamma$.

In Expression (13), α, β, and γ are blend proportion functions. In Expression (13), it is assumed that α≥0, β≥0, γ≥0, and α+β+γ>0 are always satisfied. FIG. 9A is a conceptual diagram illustrating the blend proportion function α. FIG. 9B is a conceptual diagram illustrating the blend proportion function β. FIG. 9C is a conceptual diagram illustrating the blend proportion function γ. In FIGS. 9A, 9B, and 9C, the horizontal axis represents time, and the vertical axis represents values $\alpha(t_i^B)$, $\beta(t_i^B)$, and $\gamma(t_i^B)$ of the blend proportion functions α, β, and γ. As illustrated in FIG. 9A, the blend proportion function α is a monotonically decreasing function. As illustrated in FIG. 9B, the blend proportion function β is a convex function. As illustrated in FIG. 9C, the blend proportion function γ is a monotonically increasing function. In FIGS. 9A, 9B, and 9C, $t^{end}$ denotes the current time, $t^{end}+1$ hours denotes a time point after 1 hour, and $t^{end}+5$ hour denotes a time point after 5 hours. At $t^{end}$, the value $\alpha(t_i^B)$ of the blend proportion function $\alpha$ becomes dominant, and the values $\beta(t_i^B)$ and $\gamma(t_i^B)$ of the blend proportion functions $\beta$ and $\gamma$ are zero or almost zero. At a time point of $t^{end}+1$ hour, a sum of the values $\alpha(t_i^B)$ and $\beta(t_i^B)$ of the blend proportion functions $\alpha$ and $\beta$ becomes dominant, and the value $\gamma(t_i^B)$ of the blend proportion function $\gamma$ is zero. At a time point of $t^{end}+5$ hour, the value $\alpha(t_i^B)$ of the blend proportion function $\alpha$ is almost zero, and a sum of the values $\beta(t_i^B)$ and $\gamma(t_i^B)$ of the blend proportion functions $\beta$ and $\gamma$ becomes dominant.

In Expression (13), the distribution proportions of the temporary predicted values T, C, and W are changed according to how distant from the current time the prediction time is. For example, the calculation unit 35 calculates the predicted value B by blending the temporary predicted values T, C, and W according to the distribution proportions at a time point after 1 hour. For example, the calculation unit 35 calculates the predicted value B by blending the temporary predicted values T, C, and W according to the distribution proportions at a time point after 5 hours. The distribution proportions are determined such that the distribution proportions of a prediction period in which prediction accuracy of the temporary predicted values T, C, and W is high or a prediction period in which the prediction accuracy is expected to be high increase. In other words, the distribution proportions are determined such that the distribution proportions of the temporary predicted values increase in a good prediction period of each prediction method.

In prediction of PV electric power, prediction accuracies of the temporary predicted value T, the temporary predicted value C, and the temporary predicted value W vary depending on the prediction time. For example, the temporary predicted value T based on a result value of generated power tends to be excellent in prediction accuracy in the future of 1 hour after the current time. The temporary predicted value C based on an amount of cloud tends to be excellent in prediction accuracy in the future of 1 hour to 5 hours after the current time. The temporary predicted value W based on weather data tends to be excellent in prediction accuracy in the future of 6 hours to 48 hours (2 days) after the current time. That is, a nearest future time of 1 hour after the current time can be said to be a prediction period in which prediction accuracy of the temporary predicted value T is high or a prediction period in which the prediction accuracy is expected to be high. The future time of about 1 hour to 5 hours can be said to be a prediction period in which prediction accuracy of the temporary predicted value C is high or a prediction period in which the prediction accuracy is expected to be high. The future time of 6 hours to 48 hours (2 days) distant from the current time can be said to be a prediction period in which prediction accuracy of the temporary predicted value W is high or a prediction period in which the prediction accuracy is expected to be high.

A period of from the current time to a predetermined future time may be set such that the blend proportion function of the temporary predicted value T based on result values becomes dominant. For example, the calculation unit 35 may apply the blend proportion function $\alpha$ which is a monotonically decreasing function to the temporary predicted value T. The predetermined future time may be in a period of from 30 minutes to 6 hours. The predetermined future time may vary depending on a prediction target. For example, when the prediction target is PV electric power, the predetermined future time may be in a period of from 30 minutes to 3 hours. For example, when the prediction target is prediction of power demand, the predetermined future time may be in a period of from 3 hours to 24 hours. A period after the predetermined future time is set such that the blend proportion function of the temporary predicted value W based on weather forecast data becomes dominant. For example, the calculation unit 35 may apply the blend proportion function $\gamma$ which is a monotonically increasing function to the temporary predicted value W.

The calculation unit 35 may select a blend proportion function according to a difference in prediction period between the prediction methods. For example, the calculation unit 35 may use a monotonically increasing function as a blend proportion function of a prediction method of which the prediction period is long out of a plurality of prediction methods. The calculation unit 35 may use a monotonically decreasing function as a blend proportion function of a prediction method of which the prediction period is short out of a plurality of prediction methods. For example, it is assumed that there are first weather forecast data which is transmitted every 30 minutes in a prediction period of 24 hours and second weather forecast data which is transmitted every 6 hours in a prediction period of 72 hours. Here, when a desired prediction period is 36 hours, the first weather forecast data does not include a forecast period of from 24 hours to 36 hours. The second weather forecast data includes a forecast period of from 24 hours to 36 hours. However, since the second weather forecast data is a predicted value transmitted before 6 hours in maximum, it is conceivable that prediction accuracy in the nearest prediction period be low. Therefore, the calculation unit 35 applies a blend proportion function which is a monotonically decreasing function to a temporary predicted value W1 based on the first weather forecast data. Accordingly, the distribution proportion of the temporary predicted value W1 in a nearest prediction period in the future or the first half of the prediction period is increased. The calculation unit 35 applies a blend proportion function which is a monotonically increasing function to a temporary predicted value W2 based on the second weather forecast data. Accordingly, the distribution proportion of the temporary predicted value W2 in a distant prediction period in the future or the second half of the prediction period is increased. As a result, it is possible to enhance prediction accuracy of a predicted value in the whole prediction period. The calculation unit 35 may use a convex function as a blend proportion function of a prediction method of which prediction accuracy in the central period when a prediction period is divided into three periods is the highest out of a plurality of prediction methods.

Figure 10:
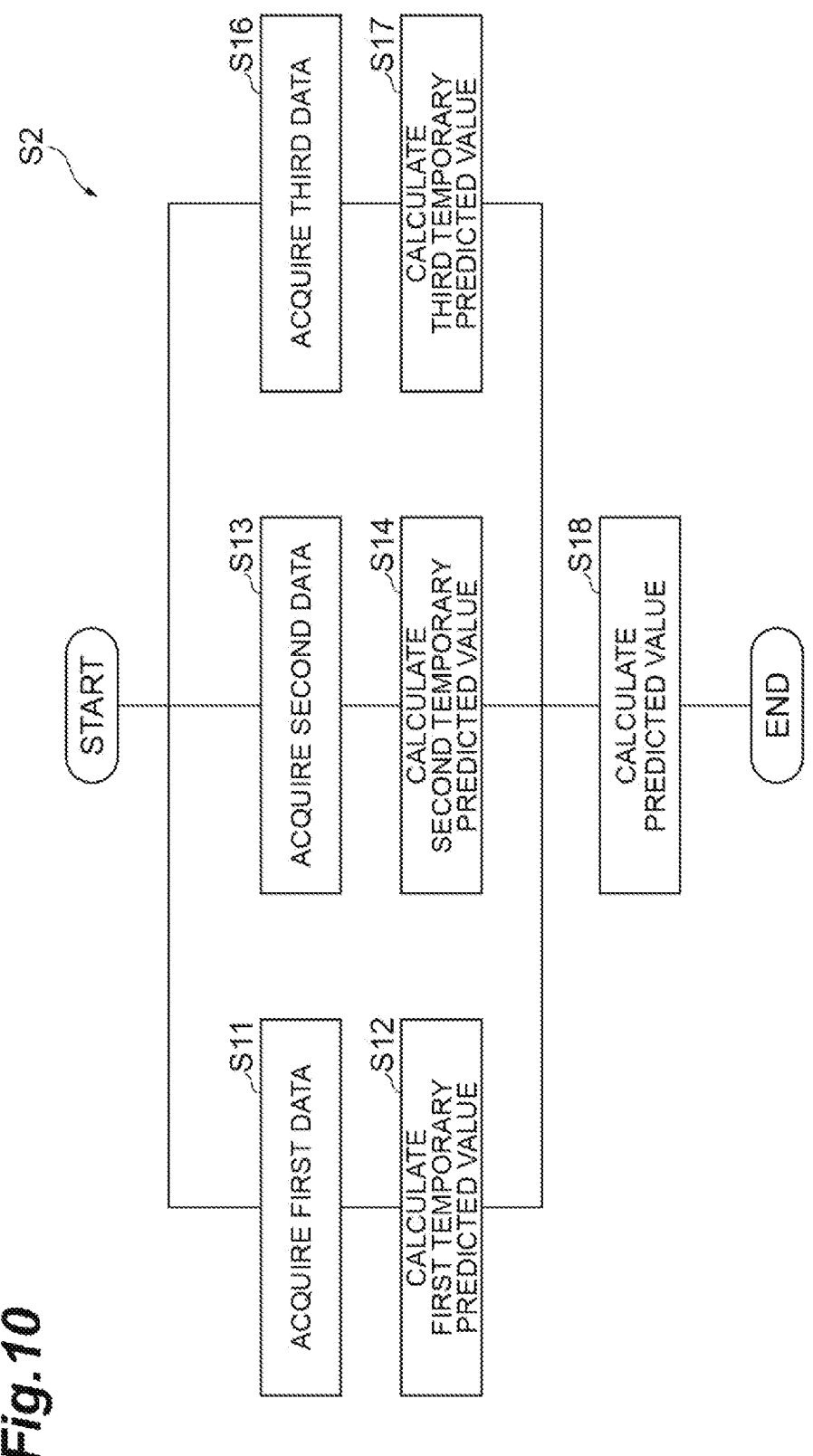
FIG. 10 is a flowchart illustrating another example of the energy prediction method.

The operation of the EMS 3A and an example of the energy prediction method will be described below with reference to FIG. 10. FIG. 10 is a flowchart illustrating another example of the energy prediction method as a process flow S2. The process flow S2 is different from the process flow S1 in that Steps S16, S17, and S18 are provided instead of Step S15. Differences of the process flow S2 from the process flow S1 will be mainly described below.

In Step S16, the EMS 3A acquires third data. For example, the third prediction unit 36 acquires image data of the sky as the third data from the sky imaging device 96.

In Step S17, the EMS 3A calculates a third temporary predicted value of energy using a third prediction method. For example, the third prediction method may be an energy prediction method using image data of the sky. The third prediction unit 36 calculates a temporary predicted value C as the third temporary predicted value based on the third prediction method using the image data of the sky.

In Step S18, the EMS 3A calculates a predicted value of energy by changing a proportion of at least one temporary predicted value out of a plurality of temporary predicted values according to a prediction time and blending the plurality of temporary predicted values. For example, the calculation unit 35 calculates the predicted value B of energy by changing the proportion of at least one temporary predicted value out of the first temporary predicted value, the second temporary predicted value, and the third temporary predicted value according to the prediction time and blending the first to third temporary predicted values. For example, the calculation unit 35 calculates the predicted value B using Expression (13) and the like.

In the process flow S2, Steps S11 and S12, Steps S13 and S14, and Steps S16 and S17 may be performed in parallel or may be performed in series. In Steps S12, S14, S17, and S18, the EMS 3A may blend prediction errors. For example, in Step S12, the first prediction unit 32 may output a temporary predicted value upper limit and a temporary predicted value lower limit in addition to the temporary predicted value W. In Step S14, the second prediction unit 34 may output a temporary predicted value upper limit and a temporary predicted value lower limit in addition to the temporary predicted value T. In Step S17, the third prediction unit 36 may output a temporary predicted value upper limit and a temporary predicted value lower limit in addition to the temporary predicted value C. In Step S18, the calculation unit 35 may additionally acquire a temporary predicted value upper limit and a temporary predicted value lower limit of each of the plurality of temporary predicted values W, T, and C. The calculation unit 35 may calculate a prediction error span of the predicted value B of energy by blending the temporary predicted value upper limits and the temporary predicted value lower limits according to the proportions of the plurality of temporary predicted values W, T, and C. For example, the calculation unit 35 may calculate the prediction error span using Expression (13). In Expression (13), the calculation unit 35 may apply the blend proportion function $\alpha$ to the temporary predicted value upper limit and the temporary predicted value lower limit of the temporary predicted value T. The calculation unit 35 may apply the blend proportion function $\beta$ to the temporary predicted value upper limit and the temporary predicted value lower limit of the temporary predicted value C. The calculation unit 35 may apply the blend proportion function $\gamma$ to the temporary predicted value upper limit and the temporary predicted value lower limit of the temporary predicted value W.

[Hardware Configuration]

Figure 11:
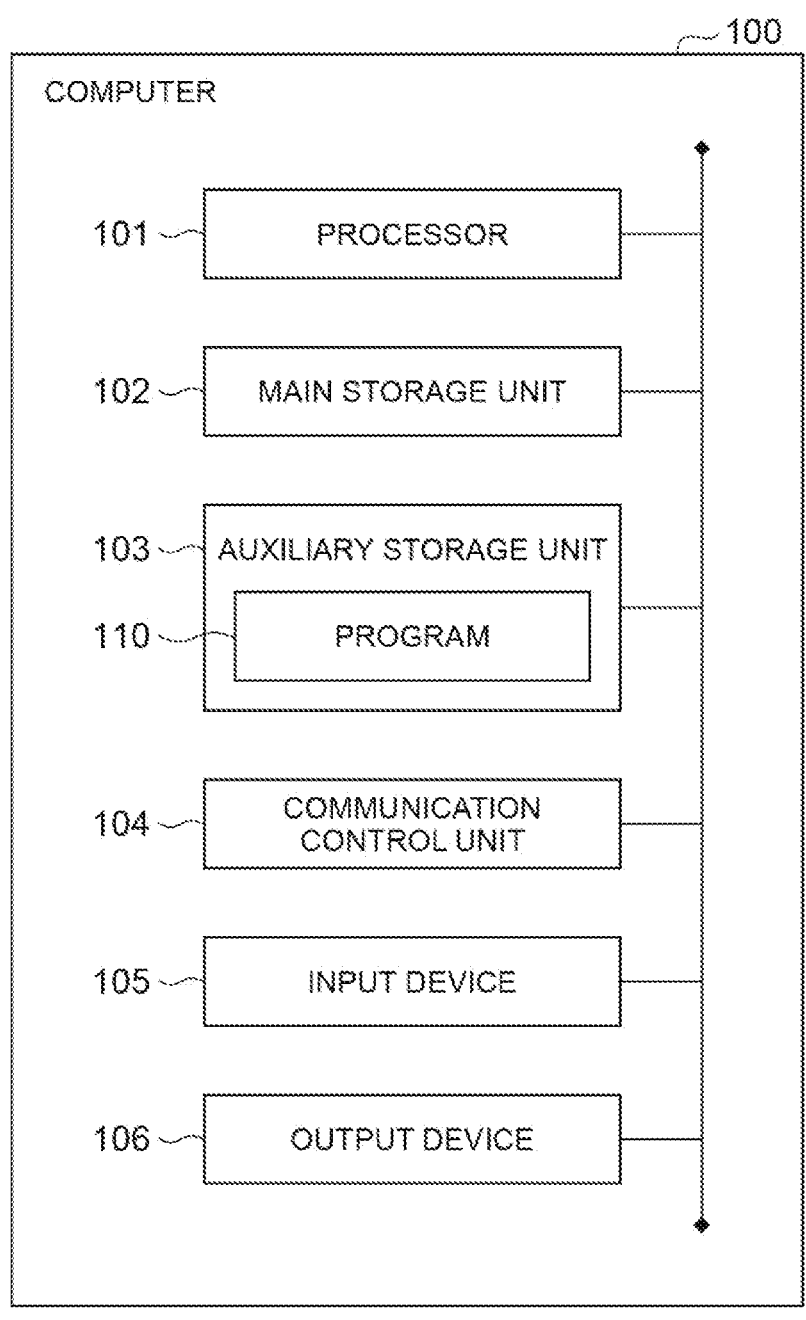
FIG. 11 is a diagram illustrating an example of a hardware configuration of the power supply system.

FIG. 11 is a diagram illustrating an example of a hardware configuration of the power supply system 1. FIG. 11 illustrates a computer 100 serving as the EMS 3 or 3A. The computer 100 includes a central processing unit (CPU) 101, a main storage unit 102, an auxiliary storage unit 103, a communication control unit 104, an input device 105, and an output device 106. The EMS 3 or 3A is constituted by one or more computers 100 including such hardware and software such as programs.

When the EMS 3 or 3A is constituted by a plurality of computers 100, the computers 100 may be locally connected or may be connected via a communication network such as the Internet or an intranet. The EMS 3 or 3A which is logically single is constructed by such connections.

The CPU 101 executes an operating system, an application program, or the like. The main storage unit 102 includes a read only memory (ROM) and a random access memory (RAM). The auxiliary storage unit 103 is a storage medium including a hard disk and a flash memory. The auxiliary storage unit 103 stores a larger amount of data than the main storage unit 102 in general. The communication control unit 104 is constituted by a network card or a radio communication module. At least a part of a communication function with another device in the EMS 3 or 3A may be realized by the communication control unit 104. The input device 105 includes a keyboard, a mouse, a touch panel, and a speech-input microphone. The output device 106 includes a display and a printer.

The auxiliary storage unit 103 stores a program 110 (an energy prediction program) and data required for processing in advance. The program 110 causes the computer 100 to perform functional elements of the EMS 3 or 3A. In accordance with the program 110, for example, processes associated with the aforementioned energy prediction method are performed by the computer 100. For example, the program 110 is read by the CPU 101 or the main storage unit 102 to operate at least one of the CPU 101, the main storage unit 102, the auxiliary storage unit 103, the communication control unit 104, the input device 105, and the output device 106. For example, the program 110 performs reading and writing of data from and to the main storage unit 102 and the auxiliary storage unit 103.

The program 110 may be stored in a material recording medium such as a CD-ROM, a DVD-ROM, or a semiconductor memory, or other non-transitory computer-readable media, and then provided. The program 110 may be provided as data signals via a communication network.

An energy prediction device according to an aspect of the present disclosure performs: acquiring a plurality of temporary predicted values of energy which are predicted by a plurality of different prediction methods; and calculating a predicted value of energy by changing a proportion of at least one temporary predicted value out of the plurality of temporary predicted values according to a prediction time and blending the plurality of temporary predicted values.

An energy prediction method according to another aspect of the present disclosure includes: a step of acquiring a plurality of temporary predicted values of energy which are predicted by a plurality of different prediction methods; and a step of calculating a predicted value of energy by changing a proportion of at least one temporary predicted value out of the plurality of temporary predicted values according to a prediction time and blending the plurality of temporary predicted values.

An energy prediction program according to another aspect of the present disclosure causes a computer to perform: a step of acquiring a plurality of temporary predicted values of energy which are predicted by a plurality of different prediction methods; and a step of calculating a predicted value of energy by changing a proportion of at least one temporary predicted value out of the plurality of temporary predicted values according to a prediction time and blending the plurality of temporary predicted values.

In the energy prediction device, the energy prediction method, and the energy prediction program, a predicted value of energy is calculated based on a plurality of temporary predicted values of energy which are predicted using a plurality of different prediction methods. At this time, the plurality of temporary predicted values are blended while changing distribution proportions of the plurality of temporary predicted values according to the prediction time. Here, prediction accuracy of the predicted value of energy can change according to the prediction time. By combining the temporary predicted values based on the plurality of different prediction methods according to the prediction time, it is possible to enhance prediction accuracy of the predicted value of energy in comparison with a case in which a single prediction method is used.

At least one temporary predicted value out of the plurality of temporary predicted values is calculated based on a prediction method using a result value of energy. By reflecting the temporary predicted value based on the result value of energy in the predicted value, it is possible to enhance prediction accuracy of the predicted value of energy.

The plurality of temporary predicted values are blended such that a proportion of the temporary predicted value calculated based on the prediction method using the result value of energy becomes dominant from a current time to a predetermined future time. A nearest future time can be a prediction period in which prediction accuracy of the temporary predicted value based on the result value of energy is high or a prediction period in which the prediction accuracy is expected to be high. By making the proportion of the temporary predicted value based on the result value of energy dominant from the current time to a predetermined future time, it is possible to further enhance prediction accuracy of the predicted value of energy.

The energy is electric power generated through photovoltaic power generation, and at least one temporary predicted value out of the plurality of temporary predicted values is calculated based on a prediction method using weather forecast data. By reflecting the temporary predicted value based on the weather forecast data in the predicted value of electric power generated through photovoltaic power generation, it is possible to enhance prediction accuracy of the predicted value of energy.

The plurality of temporary predicted values are blended such that a proportion of the temporary predicted value calculated based on the prediction method using the weather forecast data becomes dominant after a predetermined future time. The period from the current time to a distant future time can be a prediction period in which prediction accuracy of the temporary predicted value based on the weather forecast data is high or a prediction period in which the prediction accuracy is expected to be high. By making the proportion of the temporary predicted value based on the weather forecast data dominant after the future time distant from the current time, it is possible to further enhance prediction accuracy of the predicted value of energy.

A temporary predicted value upper limit and a temporary predicted value lower limit of each of the plurality of temporary predicted values are additionally acquired, and a prediction error span of the predicted value of energy is calculated by blending the temporary predicted value upper limits and the temporary predicted value lower limits of the plurality of temporary predicted values according to proportions of the plurality of temporary predicted values. By calculating the prediction error span, it is possible to improve convenience to a user who uses the predicted value of energy.

The plurality of prediction methods differ in an algorithm used for prediction. Since the plurality of prediction methods differ in an algorithm, it is possible to enhance prediction accuracy of the predicted value of energy.

The plurality of prediction methods differ in a data resource used for prediction. Temporal features of different data resources can be reflected in prediction accuracy of the predicted value. Accordingly, it is possible to enhance prediction accuracy of the predicted value of energy.

The plurality of prediction methods differ in a prediction period. Since the plurality of prediction methods differ in a prediction period, it is possible to enhance prediction accuracy of the predicted value of energy. For example, a temporary predicted value based on a prediction period from the current time to a first future time and a temporary predicted value based on a prediction period from the current time to a second future time subsequent to the first future time are combined. In this case, it is possible to enhance prediction accuracy of the predicted value of energy from the first future time to the second future time.

The plurality of prediction methods differ in the number of predicted values in a prediction period. Since the plurality of prediction methods differ in the number of predicted values (a prediction score), it is possible to enhance prediction accuracy of the predicted value of energy. For example, a temporary predicted value based on a prediction score at intervals of 30 minutes and a temporary predicted value based on a prediction score at intervals of 1 hour are combined. Since features based on the time intervals are reflected in the temporary predicted values, it is possible to enhance prediction accuracy of the predicted value of energy.

Modified Examples

The present disclosure is not limited to the aforementioned embodiments and can be modified in various forms without departing from the gist thereof. For example, a calculation resource may be cloud. The EMS 3 may acquire a plurality of temporary predicted values from an external device. The photovoltaic power generation facility 21 may not be a facility in the microgrid 2.

In the aforementioned embodiments, the blend proportion function α is an exponential function, but the present disclosure is not limited thereto. For example, the blend proportion function α may be a power function or a map function. The map function is a function obtained by linearly interpolating a plurality of points of x and y set by a user. In Expression (10), the blend proportion function α may be a monotonically decreasing function based on characteristics of the temporary predicted value T. Similarly, design of (1−α) in Expression (10) may be a monotonically increasing function.

In the aforementioned embodiments, a function set by Expression (11) is used as the blend proportion function α, but the present disclosure is not limited thereto. For example, the blend proportion function α may be set such that a difference (an error) between the temporary predicted value T and a result value and a difference (an error) between the temporary predicted value W and a result value are minimized every elapsed time from the prediction time. In this case, the errors may be minimized under the constraints that the blend proportion function α is a monotonically decreasing function. Minimization of the errors is achieved using an absolute value or a square of the differences between the predicted values and the result value.

In the aforementioned embodiments, PV electric power is calculated from the weather forecast data using rated data of a PV array, but the present disclosure is not limited thereto. For example, the calculation unit 35 may calculate the temporary predicted value W using a statistical model obtained by machine-learning relationships between solar radiations and temperatures in the past and PV generated power.

In the aforementioned embodiments, the AR model is described as an example of the second prediction method, but the present disclosure is not limited thereto. For example, the second prediction method may be a prediction method based on a mathematical model (a machine learning model or a deep learning model) such as a moving average (MA) model, an autoregressive moving average (ARMA) model, an autoregressive integrated moving average (ARIMA) model, a Holt-Winters model, a gradient boosting decision tree (GBDT) model, a long/short-term memory (LSTM) model, or a gated recurrent unit (GRU) model. The second prediction method may be, for example, a prediction method using a Kalman filter instead of an AIC minimization model.

In the aforementioned embodiments, PV electric power is described as an example of a prediction target, but the present disclosure is not limited thereto. For example, the prediction target may be electric power generated using renewable energy such as wind power generation. Since renewable energy fluctuates according to weather conditions in general, prediction using weather forecast data is often performed. The prediction target may be energy demand such as power demand, steam demand, or hydrogen demand. Since energy demand has a high correlation with weather data such as atmospheric temperature in general, prediction using weather forecast data is often performed.

In the aforementioned embodiments, a result value of generated electric power is described as an example of the result value, but the present disclosure is not limited thereto. For example, an output of a power source of renewable energy may be suppressed according to a request from a power company or the like. In general, a predicted value when the output is not suppressed is desired for prediction of generated electric power. For example, electric power generated when the output is not suppressed may be calculated based on an output suppression rate of the PCS and a measured value of generated electric power, and the calculated value may be used as the power-generation result value. Accordingly, it is possible to predict electric power generated when the output is not suppressed. When the prediction target is power demand, a value increasing or decreasing from the original value of power demand is measured due to an influence of a demand response. However, when power demand to be predicted is the original power demand when a demand response is not transmitted, a baseline value of the demand response may be used as a result value of power demand. A technique called "High 4 of 5" is known as a baseline calculation technique. Baseline calculation may be performed by the EMS 3 or may be performed by a resource aggregator.

When a result value cannot be directly measured, a calculated value or an estimated value may be used as the result value. For example, when the prediction target is power demand and there are a plurality of power consumers, it is difficult to accurately measure a result value due to a large number of measurement places. The total power consumption may be estimated by an artificial intelligence (AI) technique, a statistical process, or the like based on a value obtained by measuring power consumption of only some consumers. The estimated value may be a demand result value of the power consumers.

The EMS 3 may change the distribution proportions by determining fluctuation of the weather based on the weather forecast data. For example, the calculation unit 35 may determine whether the weather gets worse in a predetermined future time range (for example, from one hour to three hours in the future). When it is determined that the weather gets worse, the calculation unit 35 may blend a plurality of temporary predicted values by setting the proportion of the temporary predicted value W based on the weather forecast data in the predetermined future time range to be higher. Accordingly, even when the weather gets worse at a future time close to the current time, it is possible to enhance prediction accuracy of the predicted value.

[Additional Remark]

The present disclosure relates to a technique that can enhance prediction accuracy of renewable energy or power demand, and more efficient operation of electric power devices effectively using renewable energy as much as possible can be performed. Accordingly, the present disclosure contributes to the following goal of the sustainable development goals (SDGs) which are led by the UN.

Goal 7 "to guarantee all people's access to cheap, reliable, and sustainable modern energy"

The summary of the present disclosure will be described below.

(1) An energy prediction device performing:

acquiring a plurality of temporary predicted values of energy which are predicted by a plurality of different prediction methods; and calculating a predicted value of energy by changing a proportion of at least one temporary predicted value out of the plurality of temporary predicted values according to a prediction time and blending the plurality of temporary predicted values.

(2) The energy prediction device according to (1), wherein at least one temporary predicted value out of the plurality of temporary predicted values is calculated based on a prediction method using a result value of energy.

(3) The energy prediction device according to (2), wherein the plurality of temporary predicted values are blended such that a proportion of the temporary predicted value calculated based on the prediction method using the result value of energy becomes dominant from a current time to a predetermined future time.

(4) The energy prediction device according to any one of (1) to (3), wherein the energy is electric power generated through photovoltaic power generation, and wherein at least one temporary predicted value out of the plurality of temporary predicted values is calculated based on a prediction method using weather forecast data.

(5) The energy prediction device according to (4), wherein the plurality of temporary predicted values are blended such that a proportion of the temporary predicted value calculated based on the prediction method using the weather forecast data becomes dominant after a predetermined future time.

(6) The energy prediction device according to any one of (1) to (5), wherein a temporary predicted value upper limit and a temporary predicted value lower limit of each of the plurality of temporary predicted values are additionally acquired, and wherein a prediction error span of the predicted value of energy is calculated by blending the temporary predicted value upper limits and the temporary predicted value lower limits of the plurality of temporary predicted values according to proportions of the plurality of temporary predicted values.

(7) The energy prediction device according to any one of (1) to (6), wherein the plurality of prediction methods differ in an algorithm used for prediction.

(8) The energy prediction device according to any one of (1) to (7), wherein the plurality of prediction methods differ in a data resource used for prediction.

(9) The energy prediction device according to any one of (1) to (8), wherein the plurality of prediction methods differ in a prediction period.

(10) The energy prediction device according to any one of (1) to (9), wherein the plurality of prediction methods differ in the number of predicted values in a prediction period.

(11) An energy prediction method including:

a step of acquiring a plurality of temporary predicted values of energy which are predicted by a plurality of different prediction methods; and a step of calculating a predicted value of energy by changing a proportion of at least one temporary predicted value out of the plurality of temporary predicted values according to a prediction time and blending the plurality of temporary predicted values.

(12) A non-transitory computer-readable media storing an energy prediction program causing a computer to perform:

a step of acquiring a plurality of temporary predicted values of energy which are predicted by a plurality of different prediction methods; and a step of calculating a predicted value of energy by changing a proportion of at least one temporary predicted value out of the plurality of temporary predicted values according to a prediction time and blending the plurality of temporary predicted values.

What is claimed is:

1. An energy prediction device configured to perform:

acquiring a plurality of temporary predicted values of electric power generated by at least one variable power generator, the plurality of temporary predicted values being predicted by a plurality of different prediction methods, and the plurality of temporary predicted values including:

at least one first temporary predicted value calculated based on a prediction method using historical data of electric power generated by the at least one variable power generator; and at least one second temporary predicted value calculated based on a prediction method using weather forecast data;

calculating a predicted amount of electric power generated by the at least one variable power generator by:

monotonically decreasing a proportion of the at least one first temporary predicted value in response to an amount of time between a current time and a predetermined time in the future increasing;

monotonically increasing a proportion of the at least one second temporary predicted value in response to the amount of time between the current time and the predetermined time in the future increasing; and blending the plurality of temporary predicted values; and charging or discharging a battery system based on the calculated predicted amount of electric power.

2. The energy prediction device according to claim 1, wherein the plurality of temporary predicted values are blended such that the proportion of the at least one first temporary predicted value becomes dominant from the current time to the predetermined time in the future.

3. The energy prediction device according to claim 1, wherein the plurality of temporary predicted values are blended such that the proportion of the at least one second temporary predicted value becomes dominant after the predetermined future time in the future.

4. The energy prediction device according to claim 1, wherein a temporary predicted value upper limit and a temporary predicted value lower limit of each of the plurality of temporary predicted values are additionally acquired, and wherein a prediction error span of the predicted amount of electric power is calculated by blending the temporary predicted value upper limits and the temporary predicted value lower limits of the plurality of temporary predicted values according to proportions of the plurality of temporary predicted values.

5. The energy prediction device according to claim 1, wherein the plurality of prediction methods differ in an algorithm used for prediction.

6. The energy prediction device according to claim 1, wherein the plurality of prediction methods differ in a data resource used for prediction.

7. The energy prediction device according to claim 1, wherein the plurality of prediction methods differ in a prediction period.

8. The energy prediction device according to claim 1, wherein the plurality of prediction methods differ in the number of predicted values in a prediction period.

9. An energy prediction method comprising:

a step of acquiring a plurality of temporary predicted values of electric power generated by at least one variable power generator, the plurality of temporary predicted values being predicted by a plurality of different prediction methods, and the plurality of temporary predicted values including:

at least one first temporary predicted value calculated based on a prediction method using historical data of electric power generated by the at least one variable power generator; and at least one second temporary predicted value calculated based on a prediction method using weather forecast data;

a step of calculating a predicted amount of electric power generated by the at least one variable power generator by:

monotonically decreasing a proportion of the at least one first temporary predicted value in response to an amount of time between a current time and a predetermined time in the future increasing;

monotonically increasing a proportion of the at least one second temporary predicted value in response to the amount of time between the current time and the predetermined time in the future increasing; and blending the plurality of temporary predicted values; and a step of charging or discharging a battery system based on the calculated predicted amount of electric power.

10. A non-transitory computer-readable media storing an energy prediction program causing a computer to perform:

a step of acquiring a plurality of temporary predicted values of electric power generated by at least one variable power generator, the plurality of temporary predicted values being predicted by a plurality of different prediction methods, and the plurality of temporary predicted values including:

at least one first temporary predicted value calculated based on a prediction method using historical data of electric power generated by the at least one variable power generator; and at least one second temporary predicted value calculated based on a prediction method using weather forecast data;

a step of calculating a predicted amount of electric power generated by the at least one variable power generator by:

monotonically decreasing a proportion of the at least one first temporary predicted value in response to an amount of time between a current time and a predetermined time in the future increasing;

monotonically increasing a proportion of the at least one second temporary predicted value in response to the amount of time between the current time and the predetermined time in the future increasing; and blending the plurality of temporary predicted values; and a step of charging or discharging a battery system based on the calculated predicted amount of electric power.

\* \* \* \* \*